United States Patent
Zhang et al.

(10) Patent No.: US 12,199,897 B2
(45) Date of Patent: Jan. 14, 2025

(54) DISCOVERY REFERENCE SIGNAL TRANSMISSION IN UNLICENSED BAND

(71) Applicant: QUALCOMM Incorporated, San Diego, CA (US)

(72) Inventors: Xiaoxia Zhang, San Diego, CA (US); Jing Sun, San Diego, CA (US); Zhifei Fan, San Diego, CA (US); Srinivas Yerramalli, San Diego, CA (US); Ahmed Abdelaziz Ibrahim Abdelaziz Zewail, San Diego, CA (US); Wooseok Nam, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 16/948,155

(22) Filed: Sep. 4, 2020

(65) Prior Publication Data

US 2021/0297212 A1     Sep. 23, 2021

Related U.S. Application Data

(60) Provisional application No. 62/992,663, filed on Mar. 20, 2020.

(51) Int. Cl.
*H04L 5/00* (2006.01)
*H04W 48/16* (2009.01)
*H04W 56/00* (2009.01)

(52) U.S. Cl.
CPC .......... *H04L 5/0048* (2013.01); *H04W 48/16* (2013.01); *H04W 56/00* (2013.01)

(58) Field of Classification Search
CPC .......... H04W 56/001; H04W 56/0015; H04W 72/0446; H04W 76/28; H04W 88/10;
(Continued)

(56) References Cited

U.S. PATENT DOCUMENTS

2018/0084593 A1*  3/2018  Chen ............... H04W 76/11
2019/0059106 A1*  2/2019  Zhang ............ H04W 72/0446
(Continued)

FOREIGN PATENT DOCUMENTS

CN       110336655 A        10/2019
EP       4096312 A1 *       11/2022
(Continued)

OTHER PUBLICATIONS

Partial International Search Report—PCT/US2021/018527—ISA/EPO—Jun. 29, 2021.
(Continued)

*Primary Examiner* — Michael Thier
*Assistant Examiner* — Prince A Mensah
(74) *Attorney, Agent, or Firm* — QUALCOMM Incorporated

(57) ABSTRACT

Various aspects of the present disclosure generally relate to wireless communication. In some aspects, a user equipment (UE) may receive information indicating a timing configuration for candidate positions of a discovery reference signal (DRS) window, wherein the DRS window is within an unlicensed millimeter wave (mmW) band, and wherein the timing configuration provides for repetition of a synchronization signal block (SSB) within the DRS window based at least in part on a wraparound scheme; and scan for the SSB in accordance with the timing configuration. Numerous other aspects are provided.

30 Claims, 9 Drawing Sheets

(58) Field of Classification Search
CPC .... H04W 48/16; H04W 56/00; H04L 5/0048; H04L 5/005–0053; H04B 7/0617–0628
See application file for complete search history.

(56) References Cited

U.S. PATENT DOCUMENTS

| | | | |
|---|---|---|---|
| 2020/0029238 A1* | 1/2020 | Si | H04W 56/001 |
| 2020/0053670 A1* | 2/2020 | Jung | H04W 56/0015 |
| 2020/0187302 A1* | 6/2020 | Si | H04W 88/06 |
| 2020/0229093 A1* | 7/2020 | Ahmad | H04W 76/28 |
| 2020/0322807 A1* | 10/2020 | Si | H04W 88/10 |
| 2020/0413356 A1* | 12/2020 | Wang | H04W 56/0015 |
| 2021/0007072 A1* | 1/2021 | Wu | H04W 56/001 |
| 2021/0282079 A1* | 9/2021 | Wu | H04L 5/005 |
| 2021/0306863 A1* | 9/2021 | Wu | H04B 7/0626 |
| 2022/0345269 A1* | 10/2022 | Alriksson | H04W 56/0015 |

FOREIGN PATENT DOCUMENTS

| | | | |
|---|---|---|---|
| WO | WO-2019157091 A1 | 8/2019 | |
| WO | WO-2020030185 A1 * | 2/2020 | ............ H04W 48/12 |

OTHER PUBLICATIONS

Samsung: "Enhancements to Initial Access Procedure for NR-U", 3GPP Draft, 3GPP TSG RAN WG1 Ad-hoc Meeting 1901, R1-1901032-Enhancements to Initial Access Procedure for NR-U, 3rd Generation Partnership Project (3GPP), Mobile Competence Centre, 650, Route Des Lucioles, F-06921 Sophia-Antipolis Cedex, vol. RAN WG1, No. Taipei, Taiwan, Jan. 21, 2019-Jan. 25, 2019, Jan. 20, 2019 (Jan. 20, 2019), XP051593877, 10 pages, Retrieved from the Internet: URL: http://www.3gpp.org/ftp/Meetings%5F3GPP%5FSYNC/RAN1/Docs/R1%2D1901032%2Ezip, [retrieved on Jan. 20, 2019], Section 2, figure 2.

* cited by examiner

DISCOVERY REFERENCE SIGNAL TRANSMISSION IN UNLICENSED BAND

CROSS-REFERENCE TO RELATED APPLICATION

This Patent application claims priority to U.S. Provisional Patent Application No. 62/992,663, filed on Mar. 20, 2020, entitled "DISCOVERY REFERENCE SIGNAL TRANSMISSION IN UNLICENSED BAND," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for discovery reference signal (DRS) transmission in an unlicensed band.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving information indicating a timing configuration for candidate positions of a discovery reference signal (DRS) window, wherein the DRS window is within an unlicensed millimeter wave (mmW) band, and wherein the timing configuration provides for repetition of a synchronization signal block (SSB) within the DRS window based at least in part on a wraparound scheme; and scanning for the SSB in accordance with the timing configuration.

In some aspects, a method of wireless communication, performed by a base station, may include transmitting information indicating a timing configuration for candidate positions of a DRS window, wherein the DRS window is within an unlicensed mmW band, and wherein the timing configuration provides for repetition of an SSB within the DRS window based at least in part on a wraparound scheme; and transmitting the SSB in accordance with the timing configuration.

In some aspects, a UE for wireless communication may include a memory and one or more processors operatively coupled to the memory. The memory and the one or more processors may be configured to receive information indicating a timing configuration for candidate positions of a DRS window, wherein the DRS window is within an unlicensed mmW band, and wherein the timing configuration provides for repetition of an SSB within the DRS window based at least in part on a wraparound scheme; and scan for the SSB in accordance with the timing configuration.

In some aspects, a base station for wireless communication may include a memory and one or more processors operatively coupled to the memory. The memory and the one or more processors may be configured to transmit information indicating a timing configuration for candidate positions of a DRS window, wherein the DRS window is within an unlicensed mmW band, and wherein the timing configuration provides for repetition of an SSB within the DRS window based at least in part on a wraparound scheme; and transmit the SSB in accordance with the timing configuration.

In some aspects, a non-transitory computer-readable medium may store one or more instructions for wireless communication. The one or more instructions, when executed by one or more processors of a UE, may cause the one or more processors to receive information indicating a timing configuration for candidate positions of a DRS window, wherein the DRS window is within an unlicensed mmW band, and wherein the timing configuration provides for repetition of an SSB within the DRS window based at least in part on a wraparound scheme; and scan for the SSB in accordance with the timing configuration.

In some aspects, a non-transitory computer-readable medium may store one or more instructions for wireless communication. The one or more instructions, when executed by one or more processors of a base station, may cause the one or more processors to transmit information indicating a timing configuration for candidate positions of a DRS window, wherein the DRS window is within an unlicensed mmW band, and wherein the timing configuration provides for repetition of an SSB within the DRS window based at least in part on a wraparound scheme; and transmit the SSB in accordance with the timing configuration.

In some aspects, an apparatus for wireless communication may include means for receiving information indicating a timing configuration for candidate positions of a DRS window, wherein the DRS window is within an unlicensed mmW band, and wherein the timing configuration provides for repetition of an SSB within the DRS window based at least in part on a wraparound scheme; and means for scanning for the SSB in accordance with the timing configuration.

In some aspects, an apparatus for wireless communication may include means for transmitting information indicating a timing configuration for candidate positions of a DRS window, wherein the DRS window is within an unlicensed mmW band, and wherein the timing configuration provides for repetition of an SSB within the DRS window based at least in part on a wraparound scheme; and means for transmitting the SSB in accordance with the timing configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. In some aspects, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
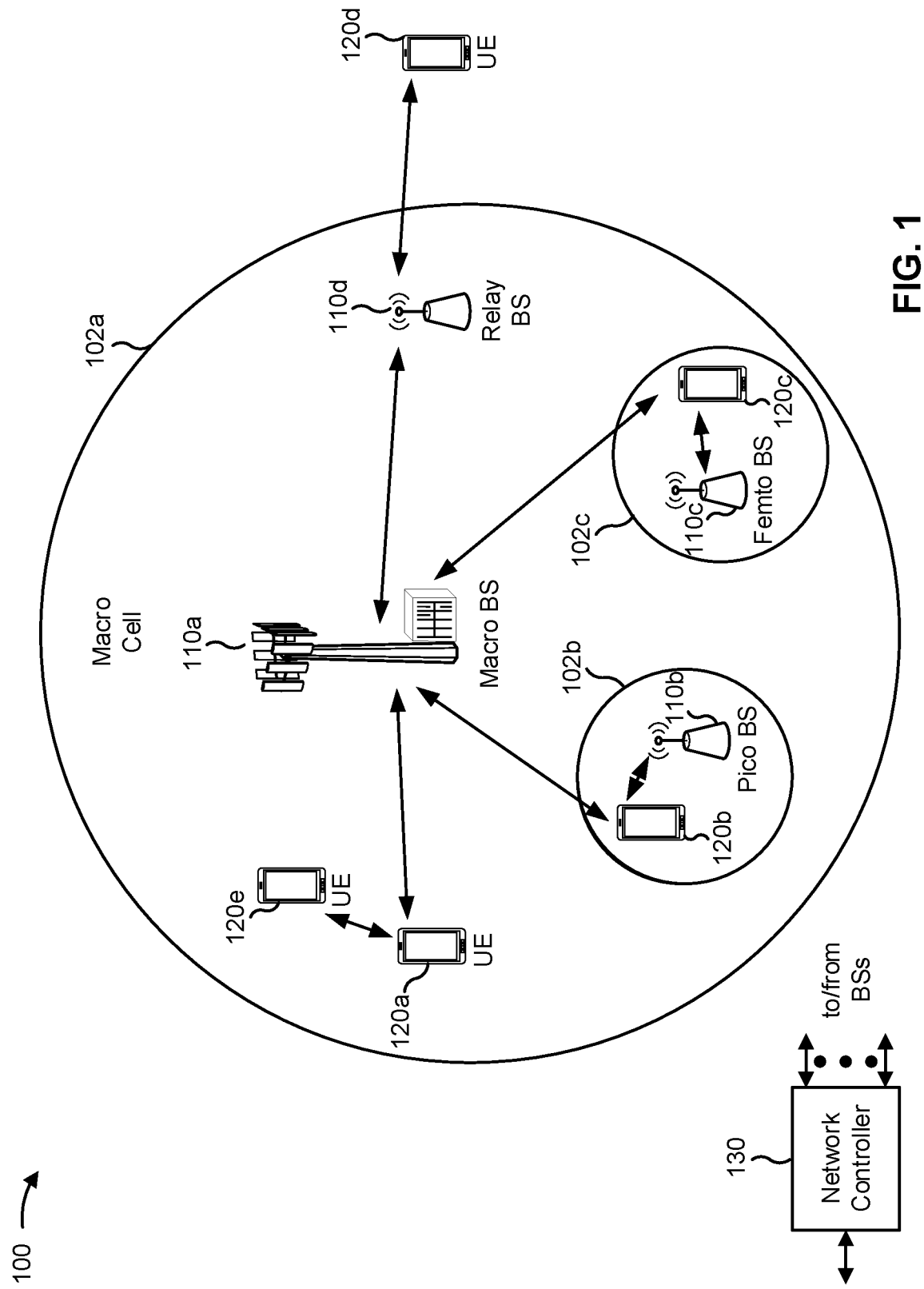
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c May be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. In some aspects, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, In some aspects, robots, drones, remote devices, sensors, meters, monitors, location tags, and/or the like, that may communicate with a base station, another device (e.g., remote device), or some other entity. A wireless node may provide, In some aspects, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. In some aspects, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). In some aspects, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
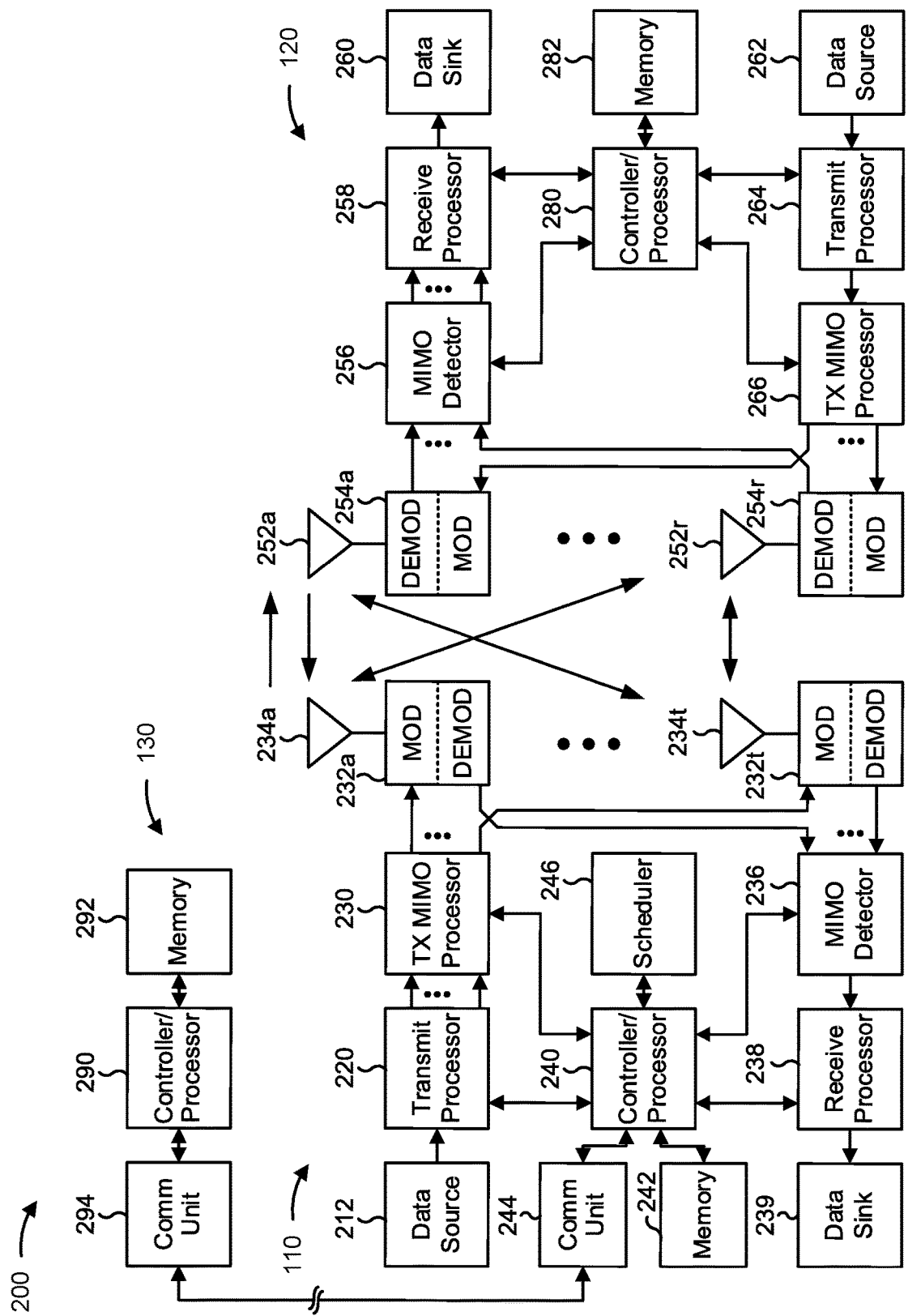
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with DRS transmission in an unlicensed band, as described in more detail elsewhere herein. In some aspects, controller/processor 240 of base station 110, controller/processor 280 of UE 120, and/or any other component(s) of FIG. 2 may perform or direct operations of process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. In some aspects, the one or more instructions, when executed (e.g., directly, or after compiling, converting, interpreting, and/or the like) by one or more processors of the base station 110 and/or the UE 120, may perform or direct operations of process 800 of FIG. 8, process 900 of FIG. 9, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving information indicating a timing configuration for candidate positions of a discovery reference signal (DRS) window, wherein the DRS window is within an unlicensed millimeter wave (mmW) band, and wherein the timing configuration provides for repetition of a synchronization signal block (SSB) within the DRS window based at least in part on a wraparound scheme; means for scanning for the SSB in accordance with the timing configuration; means for receiving information indicating a quasi-colocation relationship between candidate positions of two or more DRS windows of the plurality of DRS windows; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting information indicating a timing configuration for candidate positions of a DRS window, wherein the DRS window is within an unlicensed mmW band, and wherein the timing configuration provides for repetition of an SSB within the DRS window based at least in part on a wraparound scheme; means for transmitting the SSB in accordance with the timing configuration; means for transmitting information indicating a quasi-colocation relationship between candidate positions of two or more DRS windows of the plurality of DRS windows; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In unlicensed spectrum, a discovery reference signal (DRS) may be transmitted by a base station to facilitate discovery of the base station by other wireless communication devices (e.g., UEs, base stations, and/or the like). In some aspects, the DRS may include a synchronization signal/physical broadcast channel (SS/PBCH) block (SSB), or one or more of the signals that comprise an SSB (e.g., a primary synchronization signal, a secondary synchronization signal, a PBCH, or a combination thereof). An SSB may be associated with a quasi-colocation relationship, which may define a relationship between characteristics of the SSB and one or more other signals or channels. Thus, the characteristics of the SSB can be used to derive the characteristics of the one or more other signals or channels. Furthermore, a UE can determine serving cell timing from a detected SSB, as described below. The SSB (i.e., the DRS) may be transmitted in a DRS window. A DRS window may have a configurable length, and when the length is unconfigured, the UE may assume a certain length. The DRS window may include a plurality of candidate positions at which an SSB can be transmitted. A number of candidate positions in the DRS window may be based at least in part on a subcarrier spacing of the base station transmitting the SSBs.

Unlicensed spectrum may involve some uncertainty in the medium, since there is no central scheduler for all devices in unlicensed spectrum. Thus, a DRS window timing configuration in which SSBs are not repeated may be unsuitable for the unlicensed spectrum, since the transmission of a given SSB may be interrupted or prevented due to medium uncertainty. Furthermore, the signaling of a DRS window's timing configuration may involve overhead, particularly in higher frequency bands which may be associated with larger numbers of candidate positions in a DRS window. In some aspects, an SSB index value may be unsuitable for signaling of the DRS window's timing configuration in a DRS window associated with a larger number of candidate positions.

Some techniques and apparatuses described herein provide signaling of a timing configuration for a DRS window that is based at least in part on a wraparound scheme. The wraparound scheme may provide for repetition of an SSB at multiple candidate positions in the DRS window, thus improving a likelihood that the SSB is successfully transmitted. Aspects of the wraparound scheme are described in connection with FIGS. 4-7. Furthermore, the timing configuration may be signaled using parameters that are suitable for handling a timing configuration associated with a large number of candidate positions, such as a timing configuration associated with a millimeter wave (mmW) frequency band, a 60 GHz frequency band, and/or the like. Aspects of the parameters are described in connection with FIG. 3.

In this way, reliability of communication on higher-frequency unlicensed spectrum (e.g., mmW spectrum, 60 GHz spectrum, and/or the like) is improved. Furthermore, the usage of parameters suitable for indication of timing configurations for large numbers of candidate positions (e.g., more than 64 candidate positions and/or the like) may enable the usage of wraparound scheme based timing configurations in higher-frequency unlicensed spectrum associated with smaller subcarrier spacings (e.g., 60 kHz, 120 kHz, and/or the like).

Figure 3:
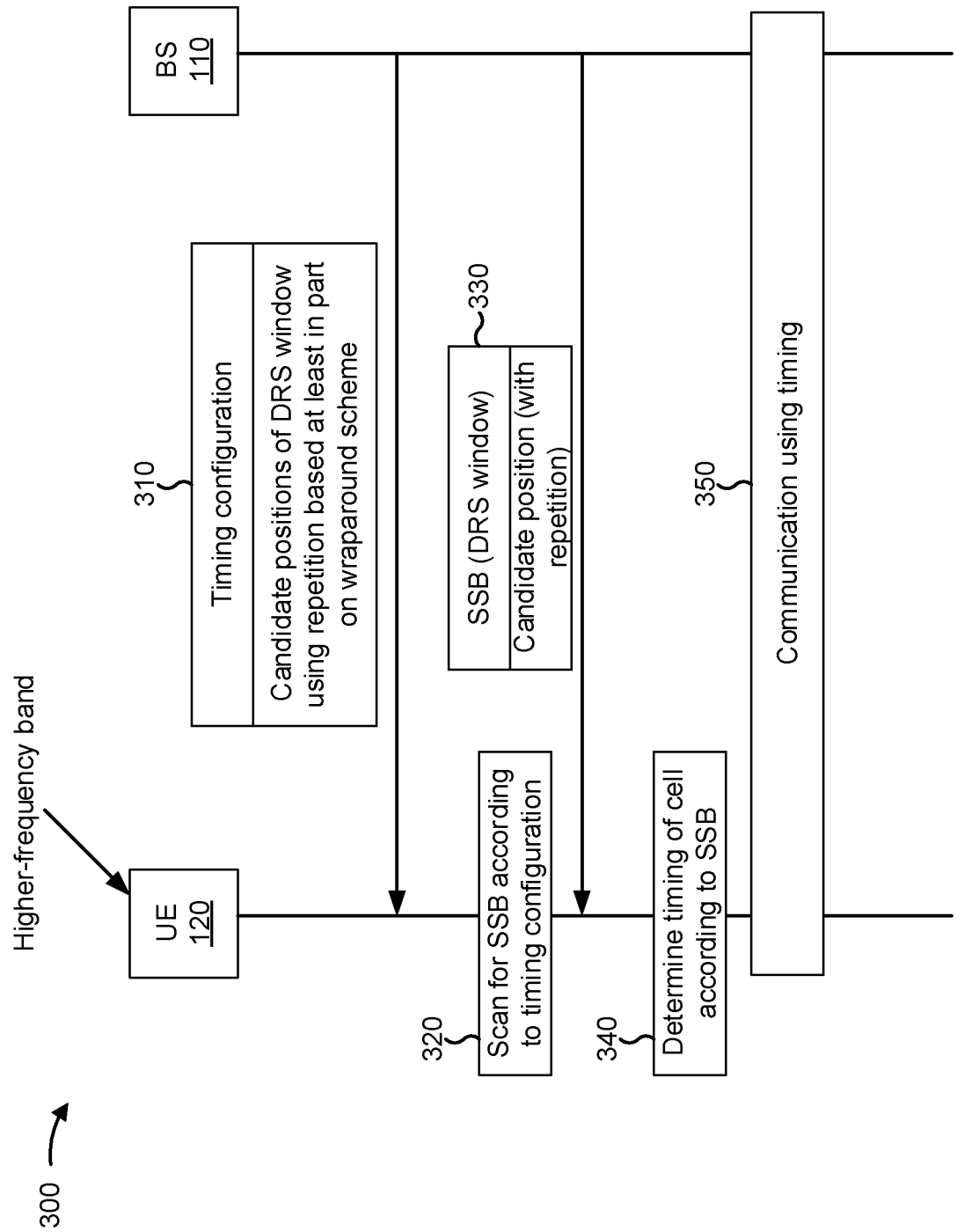
FIG. 3 is a diagram illustrating an example of signaling associated with transmission of a DRS in an unlicensed band, in accordance with various aspects of the present disclosure.

FIG. 3 is a diagram illustrating an example 300 of signaling associated with transmission of a DRS in an unlicensed band, in accordance with various aspects of the present disclosure. As shown, example 300 includes a UE 120 and a BS 110. As further shown, the UE 120 may be associated with a higher-frequency band, such as an mmW band, a 60 GHz band, and/or the like.

As shown in FIG. 3, and by reference number 310, the BS 110 may provide information indicating a timing configuration to the UE 120. As further shown, the timing configuration may indicate candidate positions of a DRS window. In some aspects, the timing configuration may indicate one or more additional SSB positions. The timing configuration and/or the candidate positions may use repetition (e.g., an SSB may be repeated in two or more candidate positions) based at least in part on a wraparound scheme. In some aspects, the timing configuration may indicate one or more additional SSB positions. Additional aspects of wraparound schemes will be described in connection with FIGS. 4-7.

The DRS window may contain up to M SSB candidate positions. In some aspects, M can be more than 64. In some aspects, with a 120 KHz subcarrier spacing, up to 80 candidate positions can be accommodated in a 5 ms DRS window. In some frequency ranges (e.g., Frequency Range 1 or Frequency Range 2), the timing configuration may be indicated using an SSB index, a least significant bit (LSB) of an SSB subcarrier offset parameter (e.g., ssb-Subcarrier-Offset), or a spare bit in a PBCH. However, in higher frequency ranges (e.g., mmW, 60 GHz, and/or the like), up to or more than 64 SSBs can be transmitted in a DRS window in order to improve SSB coverage. Thus, the SSB index and/or the LSB of the SSB subcarrier offset parameter, alone, may not provide sufficient information to indicate the timing configuration.

In some aspects, the timing configuration may be indicated using a non-LSB of the SSB subcarrier offset parameter (e.g., in addition to the LSB or as an alternative to the LSB), one or more spare bits (e.g., in addition to the spare bit or as an alternative to the spare bit) in a physical downlink control channel (PDCCH) configuration of a PBCH, and/or the like. Thus, the candidate position capacity for timing configuration indication may be increased. In some aspects, the timing configuration may be based at least in part on an assumption that the SSB grid is aligned with a resource block (RB) grid, which may reduce the size of the SSB subcarrier offset parameter, thereby freeing bits for the indication of the timing configuration. In some aspects, the configuration of the PDCCH configuration may be extended so that multiple bits can be used for timing configuration indication.

A DRS window may support up to Y candidate positions, where Y is an integer. In some aspects, Y may be 10 for a 15 kHz subcarrier spacing (SCS) and 20 for a 30 KHz SCS. A UE may determine serving cell timing from the detected SSB candidate position, where the SSB candidate positions within the DRS transmission window are indexed from 0, . . . , Y−1 (where Y=10 for 15 kHz subcarrier spacing (SCS) and Y=20 for 30 kHz SCS). For a 15 kHz or 30 kHz SCS, the SSB position index within a DRS transmission window may be detected using a combination of a PBCH demodulation reference signal (DMRS) sequence index (for 3 LSB) and 1 bit or 2 bits (such as PBCH payload bits $\bar{a}_{\bar{A}+7}$ for 15 kHz SCS, and PBCH payload bits $\bar{a}_{\bar{A}+6}$ and $\bar{a}_{\bar{A}+7}$ for 30 KHz SCS) of the 3 available bits in the PBCH payload that were used in FR2 for the most significant bit (MSB) SSB index.

Out of the Y candidate positions, multiple wraparound transmission opportunities for each SSB may be provided. In some aspects, an SSB may be associated with a quasi-colocation (QCL) relationship, and multiple transmission opportunities for an SSB with a given QCL parameter may be provided. For an SSB with a given QCL parameter, if a listen-before-talk (LBT) operation fails for the SSB, there can be another opportunity later in the same DRS window to transmit the SSB with the given QCL parameter again. The UE 120 is aware of the QCL relationship between SSBs based at least in part on indication of a factor referred to as Q. In some aspects, an SS/PBCH block index (also referred to as an SSB index) can be expressed as modulo (PBCH DMRS sequence index, Q) or modulo (Candidate SS/PBCH block index, Q). A candidate SS/PBCH block index allows multiple candidate positions for the same SSB index. For a given cell, the UE 120 may assume SS/PBCH blocks in the same candidate position within the DRS transmission window are quasi-colocated across DRS transmission windows. From the UE 120's perspective, the number of transmitted SSBs within a DRS window is not larger than Q. Q may be selected from the range {1, 2, 4, 8} and may be indicated by a MIB (for initial access) or dedicated radio resource control (RRC) signaling (for radio resource management (RRM)).

In some aspects, the timing indication may be indicated using the parameter of the PBCH that identifies Q. In some aspects, the UE 120 may receive RRC signaling or a system information block (e.g., a remaining minimum system information (RMSI) block and/or the like) that indicates Q. The UE 120 may also receive a PBCH including a value of a parameter that defines Q, and may determine the timing indication based at least in part on the value of the parameter that defines Q. In some aspects, the timing indication may be indicated using a DMRS sequence. In some aspects, the UE 120 may use a PBCH DMRS sequence that carries information indicating the timing configuration. In some aspects, the PBCH DMRS sequence may be increased relative to a baseline size to carry the information indicating the timing configuration. In some aspects, the PBCH DMRS sequence may be generated using the timing configuration as an input, or may be generated using a sequence that indicates the timing configuration.

As shown by reference number 320, the UE 120 may scan for the SSB according to the timing configuration. In some aspects, as shown by reference number 330, the UE 120 may receive the SSB in the DRS window at a particular candidate position. As shown by reference number 340, the UE 120 may determine timing of a serving cell associated with the BS 110 based at least in part on the SSB. As shown by reference number 350, the UE 120 may communicate with the BS 110 according to the timing. Thus, the UE 120 may synchronize with the BS 110 based at least in part on an SSB that is transmitted according to a wraparound scheme. A timing configuration of the wraparound scheme may be signaled using one or more parameters suitable for a large number of candidate positions (e.g., more than 64 candidate positions), thereby enabling the use of the wraparound scheme in higher frequency bands.

As indicated above, FIG. 3 is provided as an example. Other examples may differ from what is described with respect to FIG. 3.

Figure 4:
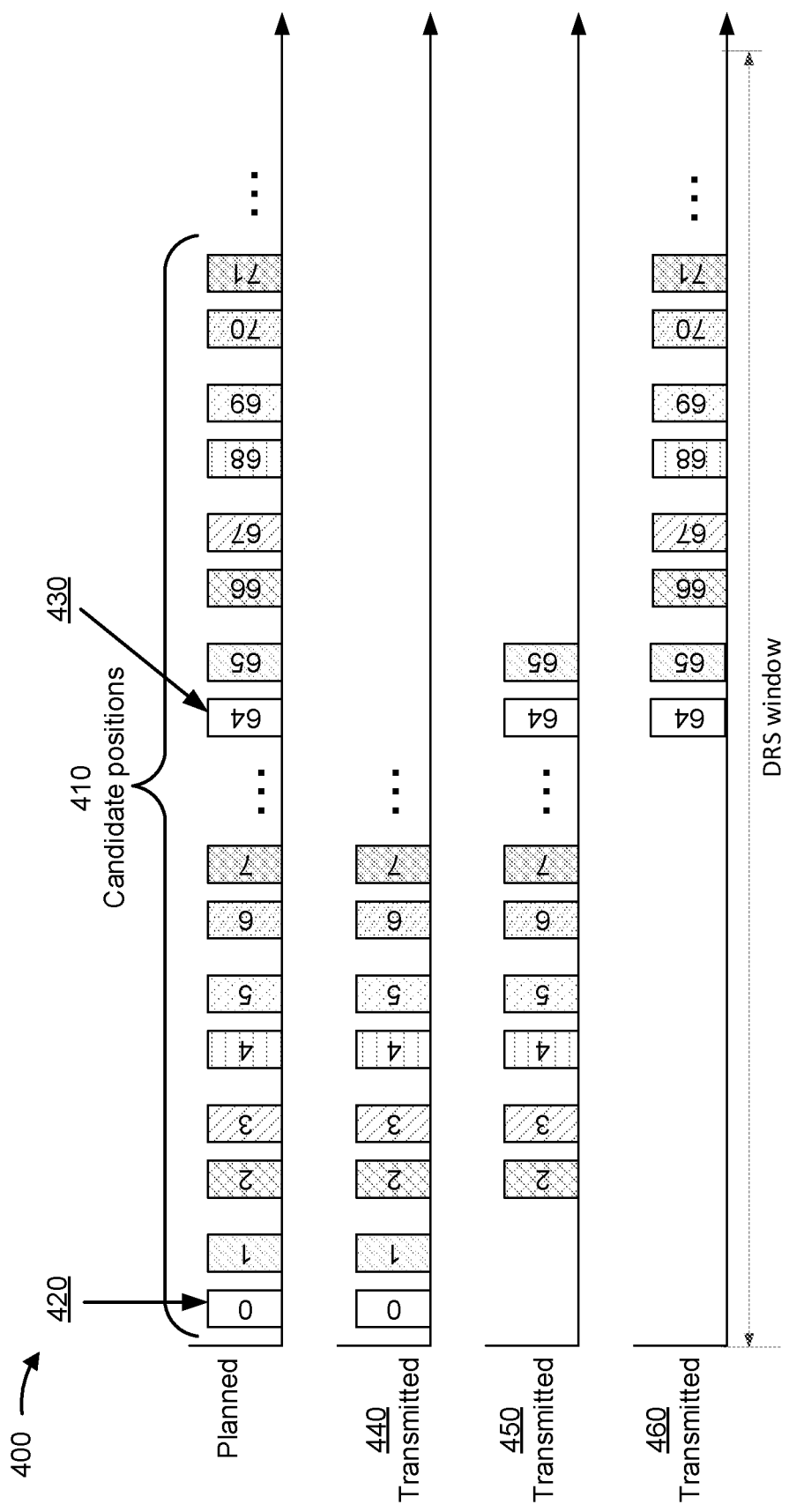
FIGS. 4-7 are diagrams illustrating examples of wraparound schemes for transmission of a DRS in an unlicensed band, in accordance with various aspects of the present disclosure.

FIGS. 4-7 are diagrams illustrating examples 400, 500, 600, and 700 of wraparound schemes for transmission of a DRS in an unlicensed band, in accordance with various aspects of the present disclosure. FIGS. 4-7 show aspects of candidate positions in one or more DRS windows. Referring to FIG. 4, in some aspects, candidate positions are illustrated by reference number 410. A candidate position illustrated with a particular fill is associated with a particular QCL relationship. In some aspects, candidate positions 0 and 64, shown by reference numbers 420 and 430, are associated with a same QCL relationship since candidate positions 0 and 64 are both illustrated with the white fill. Thus, an SSB transmitted at candidate position 64 is a repetition of an SSB transmitted at candidate position 0 since these candidate positions are illustrated with the same fill. The topmost row of each of examples 400, 500, 600, and 700 illustrates a planned set of candidate positions, and lower rows illustrate configurations of transmitted SSBs. For example, a base station may not transmit on all planned candidate positions for various reasons, such as failure to secure the medium and/or the like.

Reference numbers 440, 450, and 460 show candidate positions for SSBs in different transmissions. In example 400, there are more than 64 possible SSB positions (e.g., M>64). In this case, the wraparound pattern indicates that a set of 64 candidate positions is used, and the candidate positions wrap around every 64 positions. Thus, in the transmission shown in reference number 450, candidate positions 64 and 65 have a same QCL relationship as candidate positions 0 and 1, respectively, in the transmission shown by reference number 440. In this way, if the medium is not available at the start of the DRS window corresponding to candidate positions 0 and 1, a base station may perform the transmission shown by reference number 440 or reference number 450, thereby enabling a UE to receive the SSB and synchronize with the base station.

Figure 5:
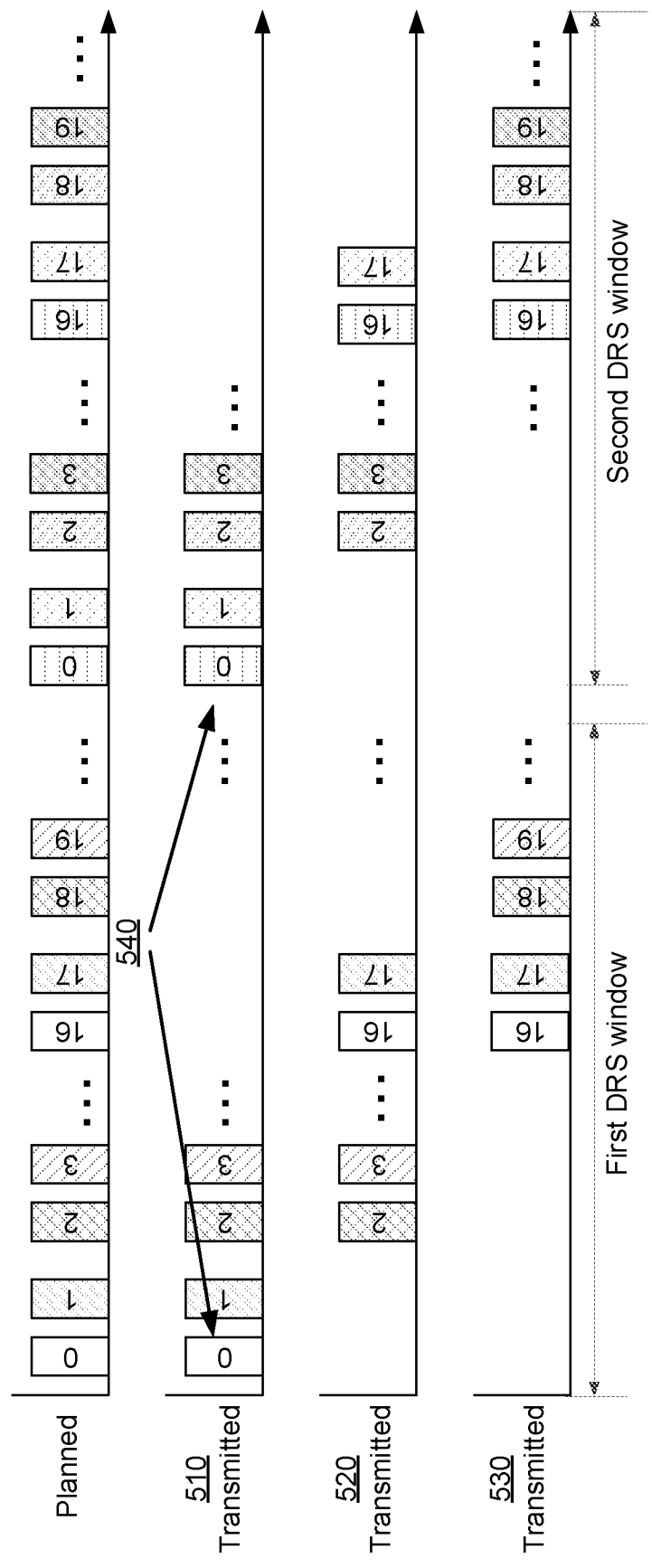

Example 500, in FIG. 5, is an example where a first set of SSBs are transmitted and remaining candidates are used for additional SSB opportunities. In some aspects, for each DRS transmission, up to 64 candidate SSB positions may be allowed. Out of the 64 candidate SSB positions, up to M SSBs can be transmitted, and the remaining 64-M positions may be used for other SSB opportunities. In example 500, M=16. Thus, each transmission 510, 520, and 530 includes 16 SSBs per DRS window, out of the first DRS window and the second DRS window. Furthermore, as shown by reference number 540, candidate positions in different DRS windows may correspond to different beams (e.g., different QCL relationships). In some aspects, the first DRS window may transmit a first 16 SSB beams, the second DRS window may transmit a second 16 SSB beams, and so on. On each DRS window, up to 4 sets of wraparound candidate positions (e.g., 64) can be dimensioned without additional PBCH signaling change. Thus, by using up to 64 candidate positions, the PBCH need not be updated while providing a wraparound scheme to improve reliability of SSB signaling in an unlicensed medium. For comparison, refer to example 400, in which more than 64 positions are defined and wraparound is performed across the 64 positions.

In example 500, Q may indicate QCL information for each DRS transmission. In some aspects, in example 500, Q may indicate that there are 16 beams in each DRS transmission. In some aspects, every second DRS transmission (or every Xth DRS transmission, where X is an integer) has a same QCL relationship on corresponding SSB positions. This signaling may be provided via RRC signaling (e.g., an RMSI or dedicated RRC signaling).

Figure 6:
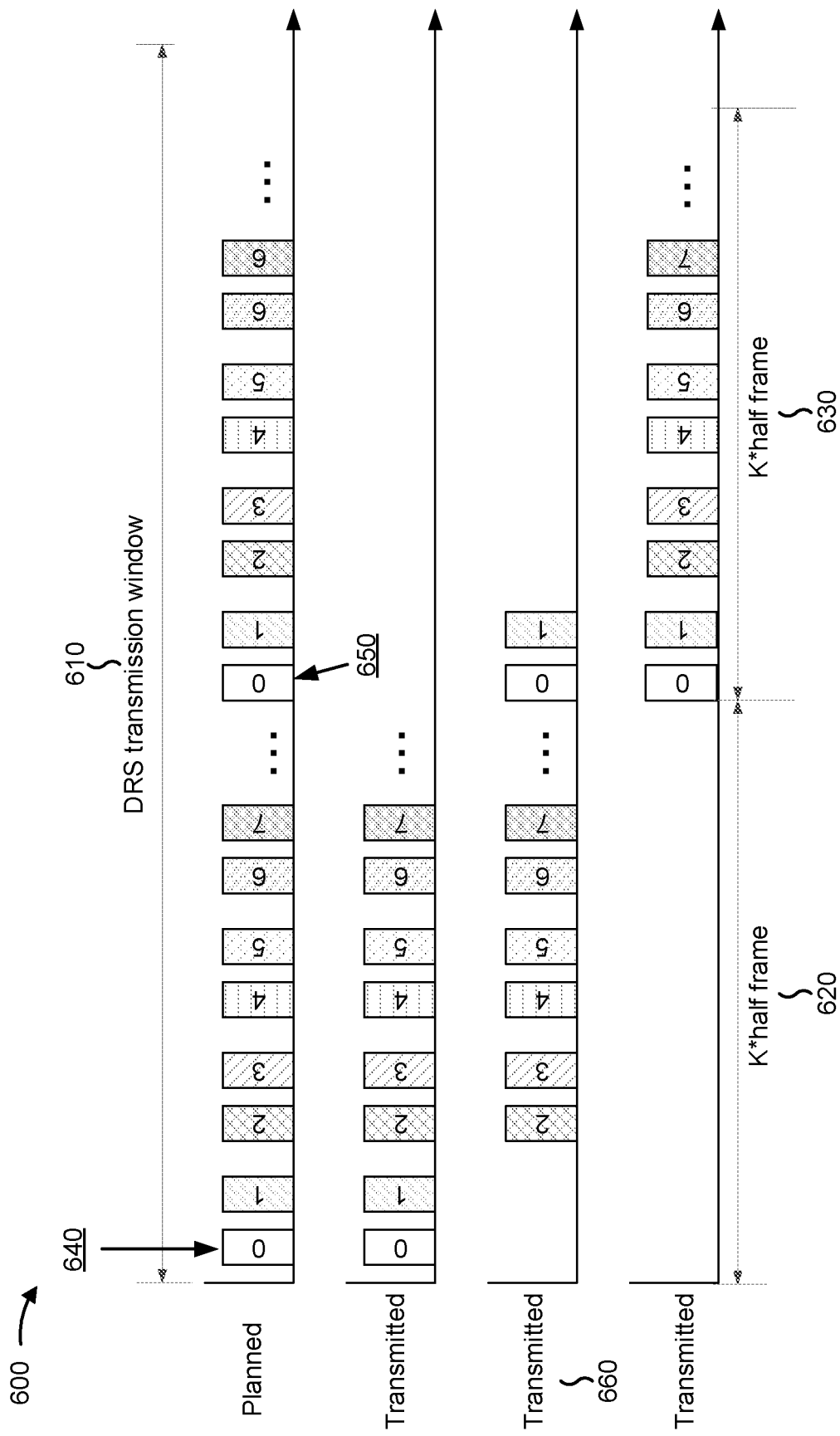
Figure 7:
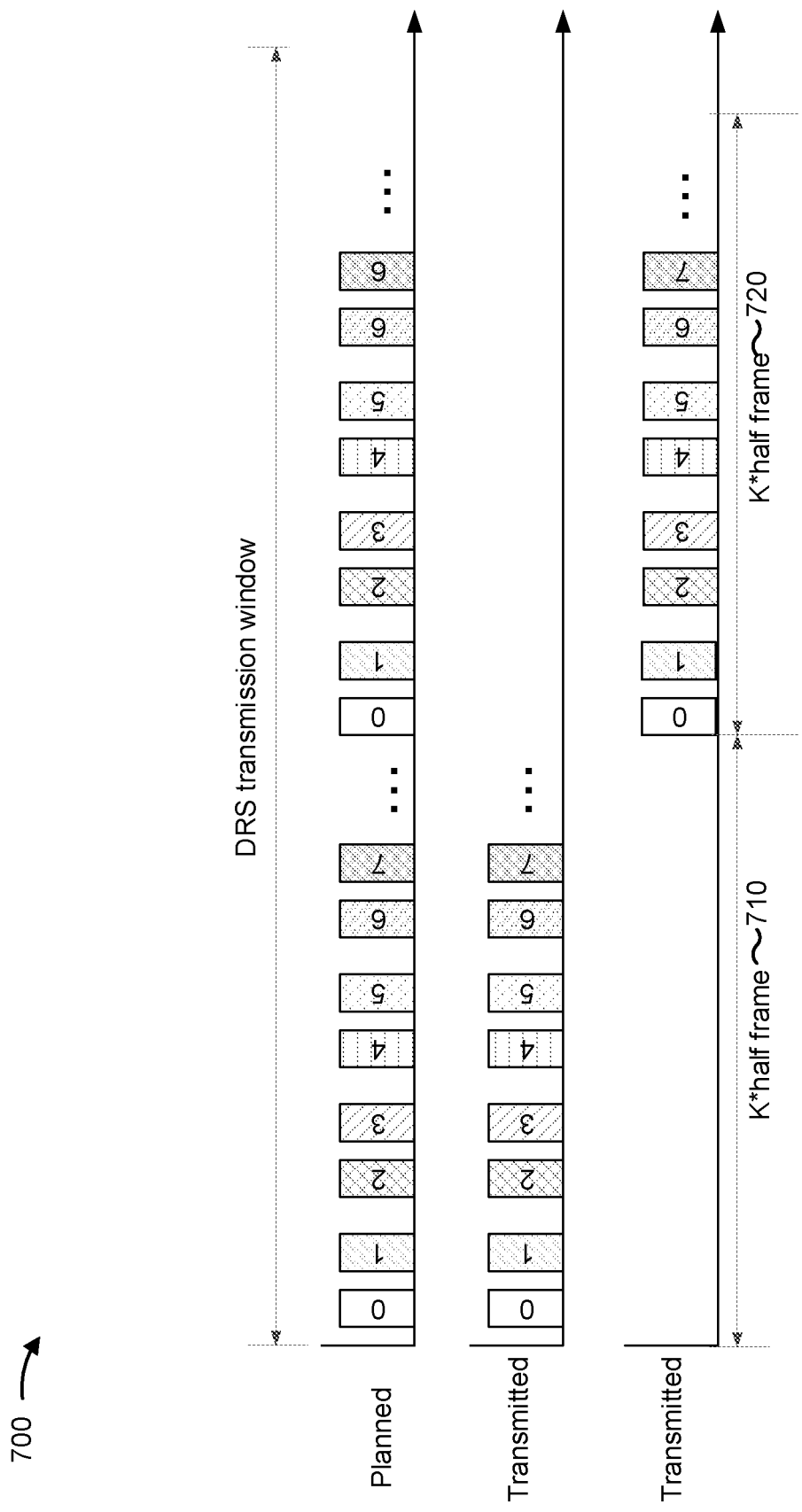

Example 600, shown in FIG. 6, is an example where a DRS window 610 is divided into sections 620 and 630. A section 620 or 630 may be defined relative to a half frame length, such as K* (half frame). In some aspects, K is an integer and a half frame is 5 ms. For a DRS transmission, each SSB beam may have up to N candidate positions. The candidate SSB position for each SSB beam is separated at least one K* (half frame) section. In some aspects, the candidate position shown by reference number 640 is separated by the candidate position 650 by one section. Within each section, up to 64 candidate SSB positions may be used. If the base station can only secure the medium after candidate positions 0 and 1, such as in the transmission 660, then the base station may transmit SSBs in candidate positions 0 and 1 in the section 630. Alternatively, as shown by example 700 of FIG. 7, if the base station fails to secure the medium for any one or more candidate positions in the section 710, the base station may transmit SSBs only in the section 720. In other words, the base station may skip to the next section based at least in part on failing to secure the medium during any one or more candidate positions of section 710. In some aspects, a base station may be permitted only to transmit up to S SSB beams for a given K* (half frame) section. All the SSB beams that are to be transmitted by the base station may be transmitted in a given K* half frame section. The examples 600 and 700 may be associated with lower latency than a system in which candidate positions are repeated across DRS windows, such as example 500.

As indicated above, FIGS. 4-7 are provided as one or more examples. Other examples may differ from what is described with respect to FIGS. 4-7.

Figure 8:
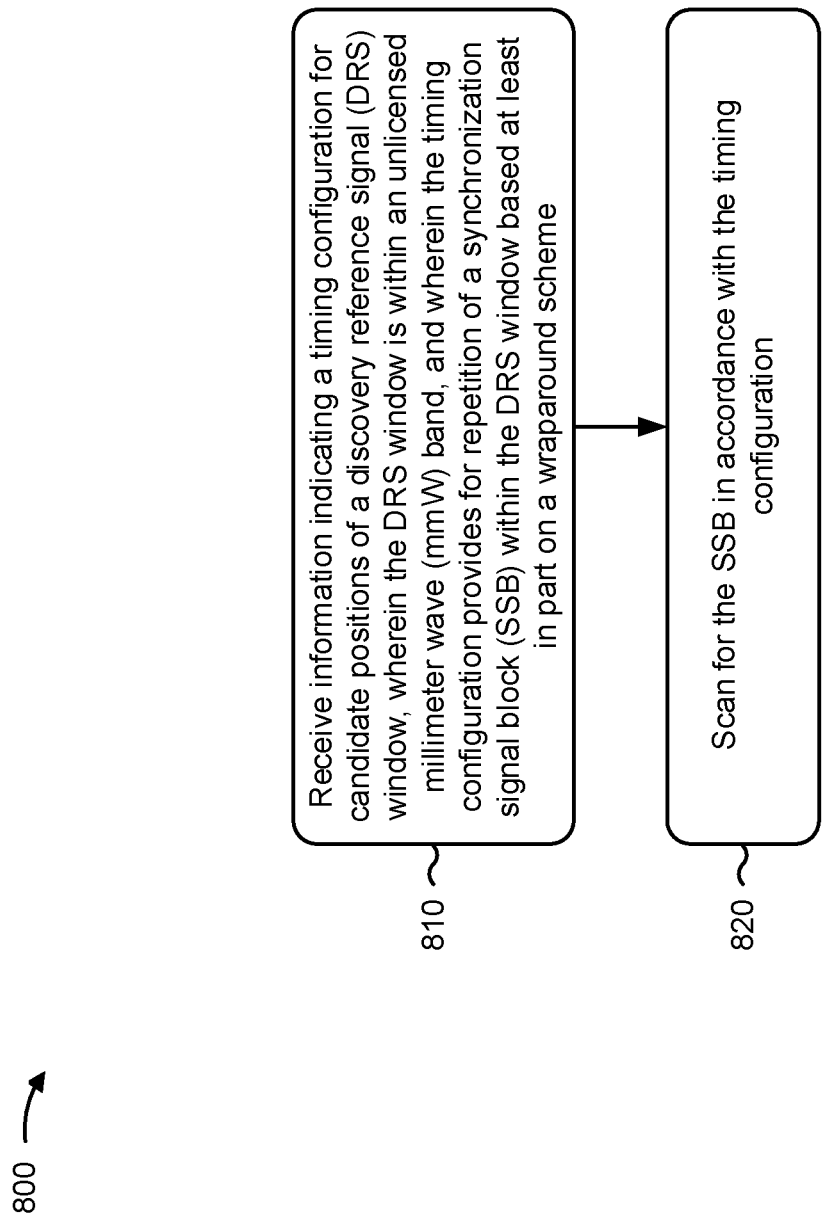
FIG. 8 is a diagram illustrating an example process performed, by a user equipment, in accordance with various aspects of the present disclosure.

FIG. 8 is a diagram illustrating an example process 800 performed, In some aspects, by a UE, in accordance with various aspects of the present disclosure. Example process 800 shows where a UE (e.g., UE 120 and/or the like) performs operations associated with discovery reference signal transmission in unlicensed band.

As shown in FIG. 8, in some aspects, process 800 may include receiving information indicating a timing configuration for candidate positions of a discovery reference signal (DRS) window, wherein the DRS window is within an unlicensed millimeter wave (mmW) band, and wherein the timing configuration provides for repetition of a synchronization signal block (SSB) within the DRS window based at least in part on a wraparound scheme (block 810). In some aspects, the UE (e.g., using antenna 252, DEMOD 254, MIMO detector 256, receive processor 258, controller/processor 280, and/or the like) may receive information indicating a timing configuration for candidate positions of a discovery reference signal (DRS) window. In some aspects, the DRS window is within an unlicensed millimeter wave (mmW) band. In some aspects, the timing configuration provides for repetition of a synchronization signal block (SSB) within the DRS window based at least in part on a wraparound scheme.

As further shown in FIG. 8, in some aspects, process 800 may include scanning for the SSB in accordance with the timing configuration (block 820). In some aspects, the UE (e.g., using antenna 252, DEMOD 254, MIMO detector 256, receive processor 258, controller/processor 280, and/or the like) may scan for the SSB in accordance with the timing configuration, as described above.

The process 800 may include additional aspects, such as any single implementation or any combination of aspects described below or in connection with one or more other processes described elsewhere herein.

In a first aspect, the information indicating the timing configuration comprises: a non-least significant bit of an SSB subcarrier offset parameter, one or more bits of a control channel configuration parameter, one or more bits of an extension of the control channel configuration parameter, or a combination thereof.

In a second aspect, alone or in combination with the first aspect, the information indicating the timing configuration is indicated by an SSB quasi-colocation relationship parameter of a PBCH, and wherein the method further comprises receiving radio resource control signaling, separate from the SSB quasi-colocation relationship parameter, indicating an SSB quasi-colocation relationship parameter for the DRS window.

In a third aspect, alone or in combination with any one or more of the first and second aspects, the information indicating the timing configuration is indicated by a PBCH demodulation reference signal (DMRS) sequence.

In a fourth aspect, alone or in combination with any one or more of the first through third aspects, the repetition of the SSB occurs every M candidate positions, and wherein there are more than M candidate positions in the DRS window.

In a fifth aspect, alone or in combination with any one or more of the first through fourth aspects, a set of SSBs transmitted in the DRS window are located at candidate positions starting after an earliest candidate position of the DRS window.

In a sixth aspect, alone or in combination with any one or more of the first through fifth aspects, the DRS window is a first DRS window of a plurality of DRS windows, and wherein respective subsets of SSBs, of a set of SSBs of a DRS transmission, are transmitted in the plurality of DRS windows, and wherein the wraparound scheme indicates wraparound candidate positions in the plurality of DRS windows.

In a seventh aspect, alone or in combination with any one or more of the first through sixth aspects, a same candidate position in two different DRS windows, of the plurality of DRS windows, corresponds to different beams used to transmit respective SSBs of the set of SSBs.

In an eighth aspect, alone or in combination with any one or more of the first through seventh aspects, an SSB quasi-colocation relationship parameter indicates quasi-colocation information for a subset of SSBs of the respective subsets of SSBs.

In a ninth aspect, alone or in combination with any one or more of the first through eighth aspects, process 800 includes receiving information indicating a quasi-colocation relationship between candidate positions of two or more DRS windows of the plurality of DRS windows.

In a tenth aspect, alone or in combination with any one or more of the first through ninth aspects, the information indicating the quasi-colocation relationship is received using radio resource control signaling.

In an eleventh aspect, alone or in combination with any one or more of the first through tenth aspects, the DRS window is divided into a plurality of sections, wherein the SSB is associated with two or more candidate positions, and wherein the two or more candidate positions are located in respective sections of the plurality of sections.

In a twelfth aspect, alone or in combination with any one or more of the first through eleventh aspects, up to 64 candidate positions are included in each section of the plurality of sections.

In a thirteenth aspect, alone or in combination with any one or more of the first through twelfth aspects, all SSBs, of a plurality of SSBs to be transmitted in the DRS window, are included in a section of the plurality of sections.

In a fourteenth aspect, alone or in combination with any one or more of the first through thirteenth aspects, the plurality of sections are defined relative to a half frame length of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
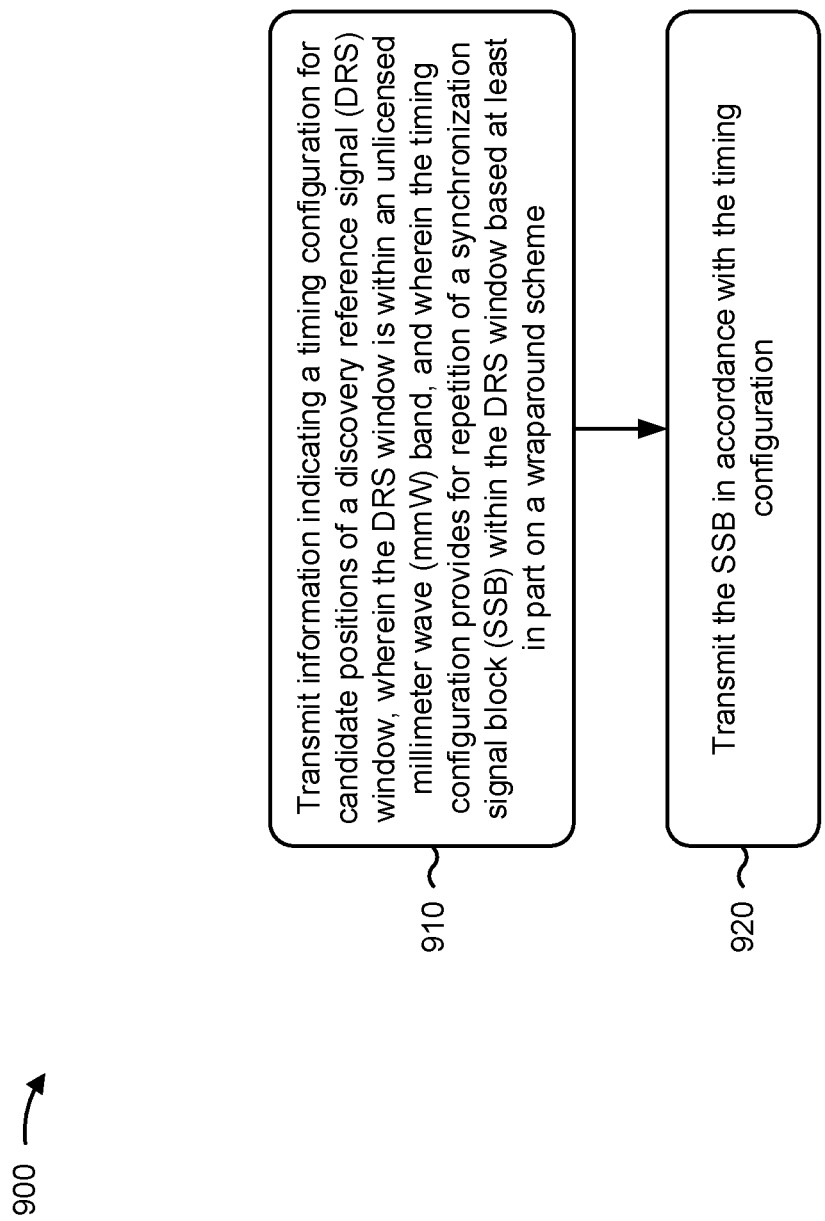
FIG. 9 is a diagram illustrating an example process performed, by a base station, in accordance with various aspects of the present disclosure.

FIG. 9 is a diagram illustrating an example process 900 performed, In some aspects, by a base station, in accordance with various aspects of the present disclosure. Example process 900 shows where a base station (e.g., BS 110 and/or the like) performs operations associated with discovery reference signaling in an unlicensed band.

As shown in FIG. 9, in some aspects, process 900 may include transmitting information indicating a timing configuration for candidate positions of a DRS window, wherein the DRS window is within an unlicensed mmW band, and wherein the timing configuration provides for repetition of an SSB within the DRS window based at least in part on a wraparound scheme (block 910). In some aspects, the base station (e.g., using controller/processor 240, transmit processor 220, TX MIMO processor 230, MOD 232, antenna 234, and/or the like) may transmit information indicating a timing configuration for candidate positions of a DRS window. In some aspects, the DRS window is within an unlicensed mmW band. In some aspects, the timing configuration provides for repetition of an SSB within the DRS window based at least in part on a wraparound scheme.

As further shown in FIG. 9, in some aspects, process 900 may include transmitting the SSB in accordance with the timing configuration (block 920). In some aspects, the base station (e.g., using controller/processor 240, transmit processor 220, TX MIMO processor 230, MOD 232, antenna 234, and/or the like) may transmit the SSB in accordance with the timing configuration, as described above.

The process 900 may include additional aspects, such as any single implementation or any combination of aspects described below or in connection with one or more other processes described elsewhere herein.

In a first aspect, the information indicating the timing configuration comprises: a non-least significant bit of an SSB subcarrier offset parameter, one or more bits of a control channel configuration parameter, one or more bits of an extension of the control channel configuration parameter, or a combination thereof.

In a second aspect, alone or in combination with the first aspect, the information indicating the timing configuration is indicated by an SSB quasi-colocation relationship parameter of a PBCH, and wherein the method further comprises transmitting radio resource control signaling, separate from the SSB quasi-colocation relationship parameter, indicating an SSB quasi-colocation relationship parameter for the DRS window.

In a third aspect, alone or in combination with any one or more of the first and second aspects, the information indicating the timing configuration is indicated by a PBCH demodulation reference signal (DMRS) sequence.

In a fourth aspect, alone or in combination with any one or more of the first through third aspects, the repetition of the SSB occurs every M candidate positions, and wherein there are more than M candidate positions in the DRS window.

In a fifth aspect, alone or in combination with any one or more of the first through fourth aspects, a set of SSBs transmitted in the DRS window are located at candidate positions starting after an earliest candidate position of the DRS window.

In a sixth aspect, alone or in combination with any one or more of the first through fifth aspects, the DRS window is a first DRS window of a plurality of DRS windows, and respective subsets of SSBs, of a set of SSBs of a DRS transmission, are transmitted in the plurality of DRS windows, and the wraparound scheme indicates wraparound candidate positions in the plurality of DRS windows.

In a seventh aspect, alone or in combination with any one or more of the first through sixth aspects, a same candidate position in two different DRS windows, of the plurality of DRS windows, corresponds to different beams used to transmit respective SSBs of the set of SSBs.

In an eighth aspect, alone or in combination with any one or more of the first through seventh aspects, an SSB quasi-colocation relationship parameter indicates quasi-colocation information for a subset of SSBs of the respective subsets of SSBs.

In a ninth aspect, alone or in combination with any one or more of the first through eighth aspects, process 900 includes transmitting information indicating a quasi-colocation relationship between candidate positions of two or more DRS windows of the plurality of DRS window.

In a tenth aspect, alone or in combination with any one or more of the first through ninth aspects, the information indicating the quasi-colocation relationship is transmitted using radio resource control signaling.

In an eleventh aspect, alone or in combination with any one or more of the first through tenth aspects, the DRS window is divided into a plurality of sections, wherein the SSB is associated with two or more candidate positions, and wherein the two or more candidate positions are located in respective sections of the plurality of sections.

In a twelfth aspect, alone or in combination with any one or more of the first through eleventh aspects, up to 64 candidate positions are included in each section of the plurality of sections.

In a thirteenth aspect, alone or in combination with any one or more of the first through twelfth aspects, all SSBs, of a plurality of SSBs to be transmitted in the DRS window, are included in a section of the plurality of sections.

In a fourteenth aspect, alone or in combination with any one or more of the first through thirteenth aspects, the plurality of sections are defined relative to a half frame length of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving information indicating one or more synchronization signal block (SSB) candidate positions of a discovery reference signal (DRS) window based at least in part on a wraparound scheme,
      wherein the DRS window is within an unlicensed millimeter wave (mmW) band,
      wherein a SSB index within the DRS window is determined based at least in part on a subcarrier spacing, a master information block (MIB), and a single bit in a payload,
      wherein a quasi-colocation of SSBs within the DRS window is based at least in part on the wraparound scheme,
      wherein the quasi-colocation of the SSBs within the DRS window is based at least in part on a value, and
      wherein one or more repetitions of the SSBs occurs every M SSB candidate positions; and
   scanning for at least one of the SSBs in accordance with the information,
      wherein a quantity of transmitted SSBs within the DRS window is not larger than the value.

2. The method of claim 1, wherein the information comprises:
   a non-least significant bit of an SSB subcarrier offset parameter,
   one or more bits of a control channel configuration parameter,
   one or more bits of an extension of the control channel configuration parameter, or
   a combination thereof.

3. The method of claim 1, wherein the information is indicated by an SSB quasi-colocation relationship parameter of a physical broadcast channel (PBCH).

4. The method of claim 1, wherein the information is indicated by a physical broadcast channel (PBCH) demodulation reference signal (DMRS) sequence.

5. The method of claim 1, wherein the DRS window comprises more than M candidate positions.

6. The method of claim 1, wherein the transmitted SSBs in the DRS window are located at candidate positions starting after an earliest candidate position of the DRS window.

7. The method of claim 1, wherein the DRS window is a first DRS window of a plurality of DRS windows,
   wherein respective subsets of SSBs, of a set of SSBs of a DRS transmission, are transmitted in the plurality of DRS windows, and
   wherein the wraparound scheme indicates wraparound candidate positions in the plurality of DRS windows.

8. The method of claim 7, wherein a same candidate position in two different DRS windows, of the plurality of DRS windows, corresponds to different beams used to transmit respective SSBs of the set of SSBs.

9. The method of claim 7, wherein an SSB quasi-colocation relationship parameter indicates quasi-colocation information for a subset of SSBs of the respective subsets of SSBs.

10. The method of claim 7, further comprising:
    receiving information indicating a quasi-colocation relationship between candidate positions of two or more DRS windows of the plurality of DRS windows.

11. The method of claim 10, wherein the information indicating the quasi-colocation relationship is received using radio resource control signaling.

12. The method of claim 1, wherein the DRS window is divided into a plurality of sections, wherein the SSBs are associated with two or more candidate positions, and wherein the two or more candidate positions are located in respective sections of the plurality of sections.

13. The method of claim 12, wherein up to 64 candidate positions are included in each section of the plurality of sections.

14. The method of claim 12, wherein all SSBs, of a plurality of SSBs to be transmitted in the DRS window, are included in a section of the plurality of sections.

15. The method of claim 12, wherein the plurality of sections are defined relative to a half frame length of the UE.

16. A user equipment (UE) for wireless communication, comprising:
one or more memories; and
one or more processors, coupled to the one or more memories, individually or collectively configured to:
receive information indicating one or more synchronization signal block (SSB) candidate positions of a discovery reference signal (DRS) window based at least in part on a wraparound scheme,
wherein the DRS window is within an unlicensed millimeter wave (mmW) band,
wherein a SSB index within the DRS window is determined based at least in part on a subcarrier spacing, a master information block (MIB), and a single bit in a payload,
wherein a quasi-colocation of SSBs within the DRS window is based at least in part on the wraparound scheme,
wherein the quasi-colocation of the SSBs within the DRS window is based at least in part on a value, and
wherein one or more repetitions of the SSBs occurs every M SSB candidate positions; and
scan for at least one of the SSBs in accordance with the information,
wherein a quantity of transmitted SSBs within the DRS window is not larger than the value.

17. The UE of claim 16, wherein the information comprises:
a non-least significant bit of an SSB subcarrier offset parameter,
one or more bits of a control channel configuration parameter,
one or more bits of an extension of the control channel configuration parameter, or
a combination thereof.

18. The UE of claim 16, wherein the information is indicated by an SSB quasi-colocation relationship parameter of a physical broadcast channel (PBCH).

19. The UE of claim 16, wherein the information is indicated by a physical broadcast channel (PBCH) demodulation reference signal (DMRS) sequence.

20. The UE of claim 16, wherein the DRS window comprises more than M candidate positions.

21. The UE of claim 16, wherein the transmitted SSBs in the DRS window are located at candidate positions starting after an earliest candidate position of the DRS window.

22. The UE of claim 16, wherein the DRS window is a first DRS window of a plurality of DRS windows, and
wherein respective subsets of SSBs, of a set of SSBs of a DRS transmission, are transmitted in the plurality of DRS windows, and
wherein the wraparound scheme indicates wraparound candidate positions in the plurality of DRS windows.

23. The UE of claim 16, wherein the DRS window is divided into a plurality of sections, wherein the SSBs are associated with two or more candidate positions, and wherein the two or more candidate positions are located in respective sections of the plurality of sections.

24. A non-transitory computer-readable medium storing one or more instructions for wireless communication, the one or more instructions comprising:
one or more instructions that, when executed by one or more processors of a user equipment (UE), cause the UE to:
receive information indicating one or more synchronization signal block (SSB) candidate positions of a discovery reference signal (DRS) window based at least in part on a wraparound scheme,
wherein the DRS window is within an unlicensed millimeter wave (mmW) band,
wherein a SSB index within the DRS window is determined based at least in part on a subcarrier spacing, a master information block (MIB), and a single bit in a payload,
wherein a quasi-colocation of SSBs within the DRS window is based at least in part on the wraparound scheme,
wherein the quasi-colocation of the SSBs within the DRS window is based at least in part on a value, and
wherein one or more repetitions of the SSBs occurs every M SSB candidate positions; and
scan for at least one of the SSBs in accordance with the information,
wherein a quantity of transmitted SSBs within the DRS window is not larger than the value.

25. The non-transitory computer-readable medium of claim 24, wherein the information comprises:
a non-least significant bit of an SSB subcarrier offset parameter,
one or more bits of a control channel configuration parameter,
one or more bits of an extension of the control channel configuration parameter, or
a combination thereof.

26. The non-transitory computer-readable medium of claim 24, wherein the information is indicated by an SSB quasi-colocation relationship parameter of a physical broadcast channel (PBCH).

27. An apparatus for wireless communication, comprising:
means for receiving information indicating one or more synchronization signal block (SSB) candidate positions of a discovery reference signal (DRS) window based at least in part on a wraparound scheme,
wherein the DRS window is within an unlicensed millimeter wave (mmW) band,
wherein a SSB index within the DRS window is determined based at least in part on a subcarrier spacing, a master information block (MIB), and a single bit in a payload,
wherein a quasi-colocation of SSBs within the DRS window is based at least in part on the wraparound scheme,
wherein the quasi-colocation of the SSBs within the DRS window is based at least in part on a value, and
wherein one or more repetitions of the SSBs occurs every M SSB candidate positions; and
means for scanning for at least one of the SSBs in accordance with the information, wherein a quantity of transmitted SSBs within the DRS window is not larger than the value.

28. The apparatus of claim 27, wherein the information comprises:
 a non-least significant bit of an SSB subcarrier offset parameter,
 one or more bits of a control channel configuration parameter,
 one or more bits of an extension of the control channel configuration parameter, or
 a combination thereof.

29. The apparatus of claim 27, wherein the information is indicated by an SSB quasi-colocation relationship parameter of a physical broadcast channel (PBCH).

30. The apparatus of claim 27, wherein the information is indicated by a physical broadcast channel (PBCH) demodulation reference signal (DMRS) sequence.

* * * * *